United States Patent [19]
Lucas et al.

[11] Patent Number: 5,962,559
[45] Date of Patent: Oct. 5, 1999

[54] NEUTRAL CURE ONE COMPONENT ROOM TEMPERATURE VULCANIZABLE SILICONE COMPOSITIONS

[75] Inventors: Gary M. Lucas, Scotia; Slawomier Rubinsztajn, Niskuyuna; Brian P. Bayly, Middle Grove, all of N.Y.

[73] Assignee: General Electric Company, Pittsfield, Mass.

[21] Appl. No.: 08/940,787

[22] Filed: Sep. 30, 1997

[51] Int. Cl.⁶ ....................................................... C08K 5/34
[52] U.S. Cl. ...................... 524/104; 523/212; 524/188; 524/718; 524/719; 524/730; 528/18
[58] Field of Search .............................. 523/212; 524/104, 524/188, 718, 719, 730; 528/18

[56] References Cited

U.S. PATENT DOCUMENTS

| | | |
|---|---|---|
| 3,294,739 | 12/1966 | Weyenberg . |
| 3,334,067 | 8/1967 | Weyenberg . |
| 3,708,467 | 1/1973 | Smith, Jr. et al. . |
| 4,395,526 | 7/1983 | White et al. . |
| 4,417,042 | 11/1983 | Dziark . |
| 4,499,234 | 2/1985 | Pratt et al. ................................. 528/18 |
| 4,517,352 | 5/1985 | White et al. . |
| 4,537,944 | 8/1985 | Imai et al. . |
| 4,578,492 | 3/1986 | Pratt et al. . |
| 4,593,085 | 6/1986 | Lucas . |
| 4,720,531 | 1/1988 | Chung et al. . |
| 4,760,123 | 7/1988 | Imai et al. . |
| 4,801,673 | 1/1989 | Bosch et al. . |
| 4,863,992 | 9/1989 | Wengrovius et al. . |
| 5,239,099 | 8/1993 | King et al. . |
| 5,276,123 | 1/1994 | King et al. . |
| 5,777,144 | 7/1998 | Rubinsztajn .............................. 556/407 |

FOREIGN PATENT DOCUMENTS 0 591 622 A1   4/1994   European Pat. Off. .

*Primary Examiner*—Melvyn I. Marquis
*Attorney, Agent, or Firm*—Kenneth Wheelock; Michelle Bugbee

[57] ABSTRACT

One-part alkoxy curing room temperature vulcanizable silicone compositions comprising the bi-functional compounds containing the 1-sila-azacyclopentane structure wherein the compounds function as alcohol scavengers in one-part alkoxy curing room temperature vulcanizable silicone compositions and the alcohol reaction products of these compounds function as adhesion promoters in such room temperature vulcanizable compositions.

38 Claims, No Drawings

NEUTRAL CURE ONE COMPONENT ROOM TEMPERATURE VULCANIZABLE SILICONE COMPOSITIONS

FIELD OF THE INVENTION

The present invention relates to new one-part or one-component room temperature vulcanizable silicone sealant compositions that utilize new siloxane compositions of matter wherein the siloxane composition functions both as an alcohol scavenger and as an adhesion promoter in room temperature vulcanizable silicone formulations.

BACKGROUND OF THE INVENTION

The present invention relates to a polyorganosiloxane composition. More particularly the present invention relates to room temperature curable polyorganosiloxane compositions that are rendered stable under moisture free hermetically sealed closed conditions and which cure upon contact with water present in ambient air at room temperature to form an elastomeric composition.

Among polyorganosiloxane compositions that cure at room temperature to form elastomers, one-package or one-part types that cure upon contact with water, however the water is delivered, have been widely used as elastic adhesives or coating agents in the electrical and electronic industries. Also such compositions have been used as sealants in the construction industry since they necessitate none of the troublesome steps involving the measuring and weighing of the quantities of silicones, cross-linking agents, catalysts and mixing and preparing the sealant. Because one-part compositions avoid these steps, the materials are convenient to use and reproducible in their properties.

These one-part compositions comprise a silanol terminated polydiorganosiloxane and a cross-linking agent having more than two hydrolyzable groups per molecule. Upon curing, they generally release acetic acid, a long chain carboxylic acid, an organic amine, an organic amide, an organic hydroxylamine, an organic oxime, an alcohol or acetone depending on the chemical structure of the cross-linking agent employed.

A composition that releases acetic acid, while it generally possesses excellent adhesion and cures quickly, has an offensive and irritating odor. Further, the acetic acid released is frequently corrodes metals when the sealant is used to create a seal between a metal and another substrate. While the odor problems are not as significant with long chain carboxylic acids, the corrosion problems still occur because of the carboxylic acid functionality that is present. Compositions that cure by means of releasing an amine present toxicity issues as well as causing odor. Compositions that cure through the release of hydroxylamine, oximes or amides still corrode metals because these types of compounds are known metal ligands and form complexes with susceptible transition metals such as copper, which is one mechanism of corrosion. Compositions that cure by releasing acetone suffer from yellowing and the cross-linking agents are not convenient to prepare.

Room temperature vulcanizable compositions that cure by releasing alcohols offer a certain convenience because alkoxysilanes are used as the cross-linking agents. The compounds released by curing are alcohols and these generally present no odor or toxicity problems. Alkoxy curing compositions (alcohol releasing RTV compositions) do suffer from a slow cure rate and are very easy to hydrolyze, that is very small amounts of water trigger the curing reaction. This leads to problems with storage of the compositions.

Non-corrosive, alkoxy functional, one-component RTV silicone sealants can be made from polyalkoxy terminated polydiorganosiloxane polymers, alkoxysilane crosslinking agents and Sn(IV) catalysts. As disclosed in U.S. Pat. No. 4,517,352 ('352) and U.S. Pat. No. 4,395,526 ('526), such compositions do not exhibit long term storage stability, i.e. they are not shelf stable.

Shelf-stability as applied to one-component alkoxy curing RTV compositions means a moisture curable mixture wherein the uncured and cured properties are substantially unchanged relative to a freshly prepared mixture after being stored in a moisture resistant and moisture free container after accelerated aging for 24 hours at 100° C. Alternatively shelf stability means a moisture curable mixture wherein the uncured and cured properties are substantially unchanged relative to a freshly prepared mixture after being stored in a moisture resistant and moisture free container for an extended period of time at ambient conditions, e.g. one year or two years.

In one-component RTV mixtures, free alcohol, typically methanol ($CH_3OH$), degrades the polymer in the presence of Sn(IV) catalysts. Over time this degradation leads to a failure of the mixture to cure. The solution to this problem is presented in the '352 and '526 patents where it is taught that a hydroxy reactive silane is necessary to scavenge free alcohol preventing polymer reversion thereby increasing shelf life.

A variety of mono-, di-, and tri-functional amino silanes and silazanes as alcohol (methanol) scavengers are disclosed in U.S. Pat. No. 4,593,085 ('085); U.S. Pat. No. 4,417,042 ('042); U.S. Pat. Nos. 4,395,526; 4,720,531 ('531) for use with methyldimethoxy endcapped polydimethylsiloxane polymers to give stable, fast curing, room temperature vulcanizable compositions. The preferred amino functional silanes and silazanes and their derivatives disclosed in these patents, e.g. methylaminosilanes, ethylaminosilanes, propylaminosilanes, butylaminosilanes, hexylaminosilanes and hexamethyldisilazane, are corrosive to copper bearing alloys. The low molecular weight amino by-products of the alcohol scavenging reaction cause contact and vapor corrosion when copper (or another susceptible transition metal) is present in the substrate alloy. Other one-component formulations that cure by release of acetic acid also cause corrosion, primarily because of acid attack on the metal. While titanium catalyzed one component formulations curing by release of an alcohol, (alkoxy based formulations), such as disclosed in U.S. Pat. No. 3,294,739 ('739); U.S. Pat. No. 3,334,067 ('067); and U.S. Pat. No. 3,708,467 ('467), are non-corrosive they are slower to cure, have a shorter shelf life and in some instances require a primer. Titanium catalyzed compositions are non-corrosive because the titanium catalyst decomposes to form relatively inert titanium oxides (rutile and anatase).

U.S. Pat. No. 4,537,944 ('944) and U.S. Pat. No. 4,760,123 ('123) disclose the use of certain compounds as alcohol scavengers that mitigate some of the problems associated with alkoxy based formulations. These patents disclose alcohol scavenging compounds that contain a silicon-nitrogen bond and when reacted with alcohol form a non-volatile nitrogen containing compound. Thus, these types of compounds also tend to reduce the amount of corrosion observed when room temperature vulcanizable sealants are used to seal metals because vapor corrosion is correspondingly reduced. The silicon nitrogen compounds that have been found to be particularly useful are those containing a silicon nitrogen bond wherein the nitrogen is bonded indirectly to the same or another silicon by or through one or more carbon atoms. While the '234 and '492 patents disclose and describe the use of non-corrosive alcohol scavengers derived from the reaction product of hexamethyldisilazane and aminoalkoxysilanes, the yield for this reaction is below 50 mole % and the major reaction product, 1,1-dimethoxy-2-trimethylsilyl-1-sila-azacyclopentane is highly toxic. These compounds are typically prepared by the following reaction scheme:

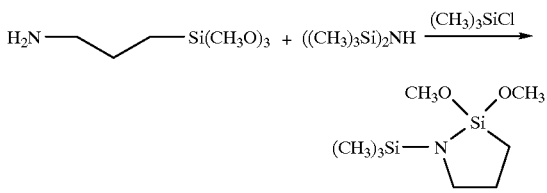

which reacts further to generate the active oligomeric species:

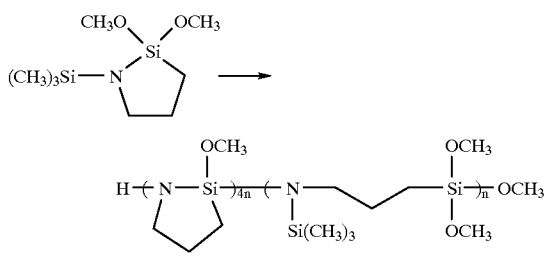

albeit in yields significantly below 50 mole % based on the starting aminoalkoxysilane. A significant problem associated with these compounds is the very toxic nature of the 1,1-dimethoxy-2-trimethylsilyl-1-sila-azacyclopentane:

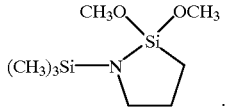

SUMMARY OF THE INVENTION

We now disclose that polymeric siloxane compounds containing the 1-sila-azacyclopentane moiety not only initially function as alcohol scavengers in one-part alkoxy curing room temperature vulcanizable silicone compositions but also after reaction with alcohol the reaction products also function as adhesion promoters. Thus the present invention provides for a neutral cure one component (one-part) room temperature vulcanizable silicone composition that is non-corrosive to copper bearing alloys. Such compositions are useful as sealants Thus the present invention provides for a room temperature vulcanizable silicone composition comprising:

a) 100 parts by weight of a polyalkoxy terminated polydiorganosiloxane having the formula:

$$(R^3O)_{3-a}R^4{}_aSi(OSiR^5R^6)_xOSi(R^3O)_{3-a}R^4{}_a$$

where $R^3$ is a one to thirteen carbon atom monovalent organic radical selected from the group consisting of alkyl radicals, alkyl ether radicals, alkylketone radicals, alkylcyano radicals and seven to thirteen carbon atom aralkyl radicals, $R^4$, $R^5$, and $R^6$ are each independently one to fifteen carbon atom monovalent organic radicals, x is a number ranging from about 50 to about 2,500 and the subscript a is zero or one whereby the viscosity ranges from about 500 to about 500,000 cps at 25° C.;

b) from about 5 to about 40 parts by weight per hundred parts by weight of polymer (a) of a reinforcing fumed or pyrogenic silica filler;

c) from zero to about 40 parts by weight per hundred parts by weight of polymer (a) of a triorganosilyl endstopped polydiorganosiloxane having the formula:

$$R^3{}_3Si(OSiR^5R^6)_yOSiR^3$$

where $R^3$, $R^5$ and $R^6$ are each independently one to fifteen carbon atom monovalent organic radicals where the subscript y is chosen whereby the viscosity ranges from about 10 to about 5,000 cps at 25° C.;

d) from zero to about 5 parts by weight per hundred parts by weight of polymer (a) of a polyalkoxysilane crosslinking agent having the formula:

$$(R^3O)_{4-b}R^4{}_bSi$$

where $R^3$ and $R^4$ are each independently one to fifteen carbon atom monovalent organic radicals where b is zero, one or two;

e) from zero to about 2 parts by weight per hundred parts by weight of polymer (a) of a cyano-functional silane having the formula:

$$(R^7O)_{3-c}R^8{}_cSiR^9CN$$

where $R^7$ and $R^8$ are each independently a one to eighteen carbon atom monovalent organic radical, $R^9$ is a two to twelve carbon atom divalent organic radical and the subscript c is zero, one, two, or three;

f) from zero to about 25 parts by weight per hundred parts by weight of polymer (a) of a silanol fluid comprising:

i) from about 1 to about 80 mole percent mono-organosiloxy units, preferably from about 10 to about 70 mole percent mono-organosiloxy units, more preferably from about 20 to about 70 mole percent mono-organosiloxy units, and most preferably from about 20 to about 60 mole percent mono-organosiloxy units wherein the mono-siloxy units have the formula $R^{10}SiO_{3/2}$;

ii) from about 0.5 to about 50 mole percent tri-organosiloxy units, preferably from about 5 to about 40 mole percent tri-organosiloxy units, more preferably from about 5 to about 30 mole percent tri-organosiloxy units, and most preferably from about 10 to about 30 mole percent tri-organosiloxy units wherein the tri-organosiloxy units have the formula $R^{10}{}_3SiO_{1/2}$;

iii) from about 1 to about 80 mole percent di-organosiloxy units, preferably from about 10 to about 70 mole percent di-organosiloxy units, more preferably from about 20 to about 70 mole percent di-organosiloxy units, and most preferably from about 20 to about 60 mole percent di-organosiloxy units wherein the di-organosiloxy units have the formula $R^{10}{}_2SiO_{2/2}$; and iv) from zero to about 25 mole percent, preferably from zero to about 10 mole percent, more preferably from about zero to about 5 mole percent and most preferably zero mole percent siloxy units wherein each siloxy unit has the formula $SiO_{4/2}$;

where each $R^{10}$ in each mono-siloxy unit, in each di-siloxy unit and in each tri-siloxy unit is independently a one to ten carbon atom monovalent organic radical;

g) from about 0.1 to about 1.0 parts by weight per hundred parts by weight of polymer (a) of a tin condensation cure catalyst; and h) from about 2.5 to about 10 parts by weight per hundred parts by weight of polymer (a) of a 1-sila-azacyclopentane functionalized silicone comprising a monovalent 1-sila-azacyclopentane moiety having the structure:

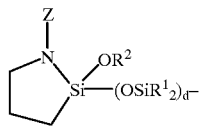

where the subscript d ranges about 1 to about 1,000, $R^1$, $R^2$ and R" are selected from the group of monovalent hydrocarbon radicals having from one to forty carbon atoms and Z is a monovalent radical selected from the group consisting of $SiR''_3$, $-(CH2)_p(CR^1R^2)_{m-p}NH_t(SiR''_3)_{2-t}$, and $-(CH_2)_p(CR^1R^2)_{m-p}HN(CH_2)_q(CR^1R^2)_{r-q}NH_t(SiR''_3)_{2-t}$, where each m and each r each independently range from 1 to 8, each p independently ranges from zero to m and each q independently ranges from zero to r and t is 0, 1, or 2.

The room temperature vulcanizable compositions of the present invention further provide for compositions whereby the 1-sila-azacyclopentane functionalized silicone reacts with an alcohol to scavenge the alcohol and whereby the reaction product of the alcohol with the 1-sila-azacyclopentane functionalized silicone is an adhesion promoter.

DETAILED DESCRIPTION OF THE INVENTION

The present invention provides for a neutral cure one-component room temperature vulcanizable silicone composition comprising:

a) 100 parts by weight of a polyalkoxy terminated polydiorganosiloxane having the formula:

$$(R^3O)_{3-a}R^4{}_aSi(OSiR^5R^6)_xOSi(R^3O)_{3-a}R^4{}_a$$

where $R^3$ is a one to thirteen carbon atom monovalent organic radical selected from the group consisting of alkyl radicals, alkyl ether radicals, alkylketone radicals, alkylcyano radicals and seven to thirteen carbon atom aralkyl radicals, $R^4$, $R^5$, and $R^6$ are each independently one to fifteen carbon atom monovalent organic radicals, x is a number ranging from about 50 to about 2,500 and the subscript a is zero or one whereby the viscosity ranges from about 500 to about 500,000 cps at 25° C., preferably from about 5,000 to about 300,000 cps at 25° C., more preferably from about 10,00 to about 300,000 cps at 25° C., and most preferably from about 10,000 to about 150,000 cps at 25° C.;

b) from about 5 to about 40 parts by weight, preferably from about 15 to about 35 parts by weight, from about 20 to about 35 parts by weight and most preferably from about 10 parts by weight to about 20 parts by weight per hundred parts by weight of polymer (a) of a reinforcing fumed or pyrogenic silica filler;

c) from zero to about 40 parts by weight, preferably from about 5 to about 30 parts by weight, more preferably from about 10 to about 30 parts by weight, and most preferably from about 10 to about 20 parts by weight per hundred parts by weight of polymer (a) of a triorganosilyl endstopped polydiorganosiloxane having the formula:

$$R^3{}_3Si(OSiR^5R^6)_yOSiR^3$$

where $R^3$, $R^5$ and $R^6$ are each independently selected and are as previously defined where the subscript y is chosen whereby the viscosity ranges from about 10 to about 5,000 cps at 25° C.;

d) from zero to about 5 parts by weight, preferably from about 0.5 to about 3.5 parts by weight, more preferably from about 0.5 to about 2.5 parts by weight, and most preferably from about 1.0 to about 2.5 parts by weight per hundred parts by weight of polymer (a) of a polyalkoxysilane crosslinking agent having the formula:

$$(R^3O)_{4-b}R^4{}_bSi$$

where $R^3$ and $R^4$ are each independently selected and are as previously defined where b is zero, one or two;

e) from zero to about 2 parts by weight, preferably from about 0.50 to about 1.50 parts by weight, more preferably from 0.8 to about 1.50 parts by weight and most preferably from about 0.8 to about 1.2 parts by weight per hundred parts by weight of polymer (a) of a cyano-functional silane having the formula:

$$(R^7O)_{3-c}R^8{}_cSiR^9CN$$

where $R^7$ and $R^8$ are each independently a one to eighteen carbon atom monovalent organic radical, $R^9$ is a two to twelve carbon atom divalent organic radical and the subscript c is zero, one, two, or three;

f) from zero to about 25 parts by weight, preferably from about 5 to about 15 parts by weight, more preferably from about 5 to about 13 parts by weight and most preferably from about 7 to about 13 parts by weight per hundred parts by weight of polymer (a) of a silanol fluid comprising:

i) from about 1 to about 80 mole percent mono-organosiloxy units, preferably from about 10 to about 70 mole percent mono-organosiloxy units, more preferably from about 20 to about 70 mole percent mono-organosiloxy units, and most preferably from about 20 to about 60 mole percent mono-organosiloxy units wherein the mono-siloxy units have the formula $R^{10}SiO_{3/2}$;

ii) from about 0.5 to about 50 mole percent tri-organosiloxy units, preferably from about 5 to about 40 mole percent tri-organosiloxy units, more preferably from about 5 to about 30 mole percent tri-organosiloxy units, and most preferably from about 10 to about 30 mole percent tri-organosiloxy units wherein the tri-organosiloxy units have the formula $R^{10}{}_3SiO_{1/2}$;

iii) from about 1 to about 80 mole percent di-organosiloxy units, preferably from about 10 to about 70 mole percent di-organosiloxy units, more preferably from about 20 to about 70 mole percent di-organosiloxy units, and most preferably from about 20 to about 60 mole percent di-organosiloxy units wherein the di-organosiloxy units have the formula $R^{10}{}_2SiO_{2/2}$; and iv) from zero to about 25 mole percent, preferably from zero to about 10 mole percent, more preferably from about zero to about 5 mole percent and most preferably zero mole percent siloxy units wherein each siloxy unit has the formula $SiO_{4/2}$;

where each $R^{10}$ in each mono-siloxy unit, in each di-siloxy unit and in each tri-siloxy unit is independently a one to ten carbon atom monovalent organic radical;

g) from about 0.1 to about 1.0 parts by weight, preferably from about 0.15 to about 0.70 parts by weight, more preferably from about 0.15 to about 0.40 parts by weight and most preferably from about 0.20 to about 0.40 parts by weight per hundred parts by weight of polymer (a) of a tin condensation cure catalyst; and h) from about 2.5 to about 10 parts by weight, preferably from about 3 to about 8 parts by weight, more preferably from about 3 to about 7 parts by weight and most preferably from about 3.5 to about 7 parts by weight per hundred parts by weight of polymer (a) of a 1-sila-azacyclopentane functionalized siloxane comprising a monovalent 1-sila-azacyclopentane moiety having the structure:

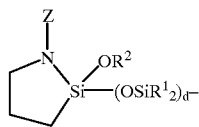

where the subscript d ranges about 1 to about 1,000, preferably from about 1 to about 100, more preferably from about 1 to about 50, and most preferably from about 2 to about 15, $R^1$, $R^2$ and R" may be any of several monovalent hydrocarbon radicals known in the art and are preferably selected from the group of monovalent hydrocarbon radicals having from one to forty carbon atoms which may be aliphatic or aromatic and which may be substituted with halogens such as fluorine, chlorine or bromine and Z is a monovalent radical selected from the group consisting of $SiR"_3$, $-(CH2)_p(CR^1R^2)_{m-p}NH_t(SiR"_3)_{2-t}$, and $-(CH_2)_p(CR^1R^2)_{m-p}HN(CH_2)_q(CR^1R^2)_{r-q}NH_t(SiR"_3)_{2-t}$, where m and r each independently range from 1 to 8 and p and q each independently range from zero to m or r and t is 0, 1, or 2. $R^1$, $R^2$ and R" are preferably selected from the group of monovalent hydrocarbon radicals consisting of methyl, ethyl, propyl, iso-propyl, trifluoropropyl, n-butyl, sec-butyl, t-butyl, phenyl, and tolyl. The 1-sila-azacyclopentane compounds utilized in the present invention are prepared by the following reaction scheme:

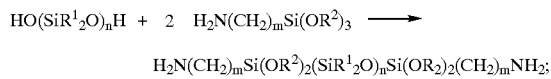

which involves the reaction between an amino alkoxy silane where the alkyl group has a length varying by the number of methylene groups present in the molecule, represented by the stoichiometric subscript m, where m is preferably 3 or 4 but may range from 2 to 8 and a polymeric diorganosiloxane where the degree of polymerization is indicated by the stoichiometric subscript n (or d as in later structures) which ranges from about 1 to about 1,000, preferably from about 1 to about 100, more preferably from about 1 to about 50, and most preferably from about 2 to about 15 in the presence of catalytic amounts of an acid compound preferably a carboxylic acid, e.g. formic or acetic. This reaction is well characterized and is taught in greater detail in U.S. Pat. No. 4,863,992 herewith incorporated by reference. The R groups, $R^1$ and $R^2$, may be any of several monovalent hydrocarbon radicals known in the art and are preferably selected from the group of monovalent hydrocarbon radicals having from one to forty carbon atoms which may be aliphatic or aromatic and which may be substituted with halogens such as fluorine, chlorine or bromine or with OH or SH groups. While the amino alkoxy silanes employed as starting materials will most generally be simply molecules that vary in the number of divalent methylene groups, $CH_2$, the methylene groups may be substituted with other monovalent hydrocarbon radicals selected from the same group as for $R^1$ and $R^2$. Thus a more general formula for the starting amino alkoxy silane is $H_2N(CH_2)_p(CR^1R^2)_{m-p}Si(OR^2)_3$ where each are $R^1$ and $R^2$ are independently selected and the subscript p is an integer which ranges from zero to m. Other amino alkoxy silanes may also be used such as $H_2N(CH_2)_p(CR^1R^2)_{m-p}HN(CH_2)_q(CR^1R^2)_{r-q}Si(OR^2)_3$ where q and r may independently assume the same values as p and m respectively. Di and tri-substituted amino alkoxysilanes of the formula $R'_{2-t}N(CH_2)_p(CR^1R^2)_{m-p}HN(CH_2)_q(CR^1R^2)_{r-q}Si(OR^2)_3$ may also be used where R' is selected from the group of monovalent radicals consisting of $R^1$ and $-(CR^1R^2)_{m-p}(CH_2)_pNH_uR'_{2-u}$ where t and u are independently 0, 1, or 2.

The second step of the preparation of the compounds utilized in the compositions of the present invention is the following reaction:

$H_2N(CH_2)_mSi(OR^2)_2(SiR^1_2O)_nSi(OR^2)_2(CH_2)_mNH_2$ +

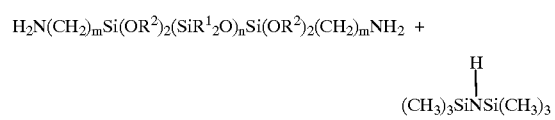

in the presence of trace amounts $(CH_3)_3SiCl$ or other acidic catalysts to yield:

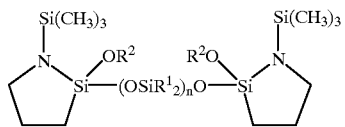

as well as more highly substituted condensation products such as for example

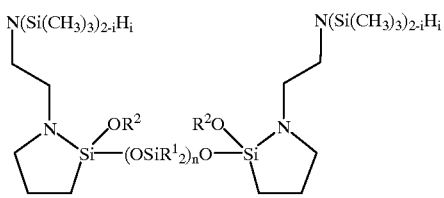

and higher order oligomers following the general scheme of condensation indicated by these products:

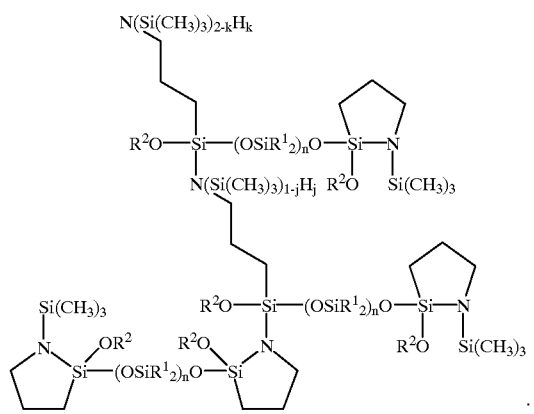

In the structure above j is 0 or 1 and k is 0, 1 or 2. The index n will be governed by the species used as a starting material as will the $R^1$ and $R^2$ substituents. Use of other hexa-organo-disilazanes will result in the substitution of other organo groups for the methyl group in the 1-sila-azacyclopentane structures.

The compounds of the present invention function sequentially, first as alcohol scavengers and as the compound undergoes alcoholysis it is converted to species that function as adhesion promoters in the room temperature vulcanizable composition.

The fumed or pyrogenic silica used as a reinforcing filler in the compositions of the present invention may optionally be treated with cyclic siloxanes such as octamethylcyclotetrasiloxane or silazane compounds such as hexamethyldisilazane.

The cyano-functional silane compounds utilized in the compositions of the present invention are preferably selected from the group consisting of 3-(cyanoethoxy)-3-methylbutenyltrimethoxysilane, 2-cyanoethylmethyldimethoxysilane, 2-cyanoethyltriethoxysilane, 2-cyanopropyltrimethoxysilane, 2-cyanoethylmethyldiethoxysilane, 3-cyanopropyltriethoxysilane and 1-cyanoethyltris(methoxyethoxy)silane.

The tin condensation cure catalysts utilized in the compositions of the present invention are preferably selected from the group consisting of di-organotin-diketonate, di-organotin-dicarboxylate and tin carboxylate compounds, more preferably from the group consisting of di-organotin-diketonate compounds and most preferably selected from the group consisting of di(n-butyl)tinbis(acetylacetonate), di(n-butyl)tinbis(benzoylacetonate), di(ethyl)tinbis(lauroylacetonate), di(methyl)tinbis(pivaloylacetonate), di(n-octyl)tinbis(acetylacetonate), di(n-propyl)tinbis(1,1,1-trifluoroacetylacetonate), di(n-butyl)tinbis(ethylacetoacetate), and di(n-butyl)tin(acetylacetonate)(ethylacetoacetate). The di-organotin dicarboxylate condensation cure catalysts are preferably selected from the group consisting of dibutyltin dilaurate, dibutyltin diacetate, dibutyltin dibenzoate, dimethyltin dibutyrate, and dimethyltin di-neodecanoate. The tin carboxylate condensation cure catalysts are preferably selected from the group consisting of carbomethoxyphenyltin tris-uberate, tin octaote, isobutyltin ticeroate, triethyltin tartrate, tin oleate, tin naphthenate, butyltin tri-2-ethylhexanoate and tin butyrate.

All United States patents referenced herein are herewith and hereby specifically incorporated by reference.

Experimental

The following preparations are illustrative of the invention and are not intended to limit the scope of the appended claims.

EXAMPLE 1

The preparation of a scavenger free methyldimethoxy terminated polydimethylsiloxane polymer was conducted using the following ingredients:

100 parts by weight of a hydroxy terminated polydimethylsiloxane (PDMS) polymer having a viscosity of 25,000 cPs at 25° C.;

2.00 parts by weight methyltrimethoxysilane;

0.3 parts by weight n-butylamine; and 0.4 0.01 part by weight formic acid.

The reaction mixture was heated for 60 minutes at 80° C. and then heated to 120° C. for two hours. After cooling to room temperature the reaction mixture was analyzed by $^{29}Si$ Fourier transform nuclear magnetic resonance (FTNMR) and was found to be a polydimthylsiloxane polymer 100% endcapped with methyldimethoxy siloxy groups.

EXAMPLE 2

2.1 Synthesis of aminofunctionalized diorganopolysiloxane

To a three necked round bottom flask equipped with a stirrer, thermometer and condenser was added 40 g of a disilanol stopped polydimthylsiloxane (silanol stopped PDMS) having an approximate value of 6 for n, to which was added 27 g of aminopropyltrimethoxysilane (m=3, $R^2$=CH3). After mixing, 2 drops, approximately 0.10 ml, of 80% aqueous formic acid was added and the reaction mixture was heated to 60° C. for one hour. The reaction mixture was stripped of unreacted starting materials by heating to 120° C. under a vacuum of 20 mm Hg, which removed methanol and unreacted aminosilane. 60 g of a clear and colorless low viscosity fluid, 20–40 cSt, was obtained. Nuclear magnetic resonance analysis confirmed existence of a linear polymer, A, with aminoalkyl substituents on the terminal silicon atoms of the polymer. Gas chromatographic analysis of the product indicated the presence of no more than 1% unreacted aminopropyltrimethoxysilane.

2.2 Preparation of sila-aza-cyclopentane compounds

To a three necked round bottom flask equipped with a stirrer, thermometer and condenser was added 60 g of aminofunctionalized diorganopolysiloxane, prepared above, 32 g of hexamethyldisilazane, and 0.5 g of trimethylchlorosilane. The reaction mixture was heated slowly to 100° C. When the reaction mixture reached 100° C., a significant amount of ammonia was evolved accompanied by the distillation of trimethylmethoxysilane. After 8 hours the reaction mixture was stripped of volatiles at 100° C. and 20 mm Hg, yielding 64 g of a light yellow fluid having a viscosity of 130 cSt. Proton nuclear magnetic resonance (nmr) analysis indicated the disappearance of the N—H group and $^{29}Si$ nmr indicated the presence of N—Si(CH$_3$)$_3$ groups. Several different alcohol scavenger/adhesion promoting compounds have been prepared (Table 1).

TABLE 1

Sila-aza-cyclopentane endcapped siloxane compounds

| Experiment Number | Amino-silane | PDMS silanol-stopped, wt. in g | Yield, g | Viscosity, cSt | Comments |
|---|---|---|---|---|---|
| 55 | Methoxy-GAP | 40 | 64 | 130 | light yellow |
| 56 | Methoxy-GAP | 40 | 61 | 120 | light yellow-overheated |
| 59 | AEAPTMS | 37 | 61 | 620 | dark yellow |
| 60 | AEAPTMS | 37 | 58 | 420 | orange |
| 65 | Ethoxy-GAP | 39 | 62 | 130 | light yellow |
| 130 | AEAPTMS | 37 | 60 | 400 | orange |

EXAMPLE 3

Preparation of a One-Part, Alkoxy Curing, Scavenger Free Silicone Sealant

Barrels 1–9 of a Werner-Pfleiderer twin-screw extruder were heated to 75° C. Barrels 10–14 were cooled to 263° K (−10° C.) with a glycol heat exchanging fluid. 65.4 wt. % of the methyldimethoxy terminated PDMS polymer of example 1, 13 wt. % of D4 (octamethycyclotetrasiloxane) treated fumed silica filler and 0.07 wt. % cyanoethyltrimethoxysilane were continuously added to barrel 1. 10. 3 wt. % of a trimethylsilyl terminated PDMS fluid having a viscosity of 100 cPs at 25° C. and 4.5 wt. % of an M,D,T silanol fluid having a viscosity of 50 cPs at 25° C. were continuously added to barrel 6. A de-airing vacuum was applied to barrel 11. 1 wt. % methyltrimethoxysilane, 0.025 wt. % glycidoxy propyltrimethoxysilane and 0.24 wt. % dibutyltindiacetate were continuously added to barrel 13. The room temperature vulcanizable sealant exited the extruder at 25–35° C. at a production rate of 40 lb./hr. and was immediately packaged into moisture proof polyethylene Semco ™ tubes for storage.

The sealant was tested for tack free time (TFT), Shore A hardness, tensile strength (psi) and ultimate elongation (%), accelerated shelf age after aging uncured sealant for 24 hours at 100° C., primerless peel adhesion (ppi) against glass, anodized (anod.) Al, bare Al, and polyvinylchloride (PVC), vapor phase corrosion (Vapor, x), and contact corrosion (Contact, x). Test results are presented in Table 2 and demonstrate the poor shelf stability of an alkoxy curing $Sn^{+4}$ catalyzed room temperature vulcanizable composition when such a composition does not possess an alcohol scavenger compound.

EXAMPLE 4

Example 4 is a repeat of example 3 with the addition of a continuous addition of 2.0 wt. % hexamethyldisilazane methanol scavenging compound to barrel 13 of the Werner-Pfleiderer extruder. The composition was tested and the results are presented in Table 2. Example 4 demonstrates that alkoxy curing room temperature vulcanizable silicone compositions that contain a disilazane alcohol scavenging compound are corrosive because of the presence of one of the disilazane decomposition products, ammonia. Example 4 is also characterized by poor primerless adhesion.

EXAMPLE 5

Example 5 is a repeat of example 3 with the addition of a continuous addition of 4.0 wt. % of compound 55 (Table 1), methanol scavenging compound, to barrel 13 of the Werner-Pfleiderer extruder. The composition was tested and the results are presented in Table 2. Example 5 demonstrates the effectiveness of compound 55 as an alcohol scavenger that affords a fast curing, alkoxy room temperature vulcanizable silicone composition that is non-corrosive to copper and brass, has excellent primerless adhesion and is shelf stable.

EXAMPLE 6

Example 6 is a repeat of example 3 with the addition of a continuous addition of 4.0 wt. % of compound 60 (Table 1), methanol scavenging compound, to barrel 13 of the Werner-Pfleiderer extruder. The composition was tested and the results are presented in Table 2. Example 6 demonstrates the effectiveness of compound 60 as an alcohol scavenger that affords a fast curing, alkoxy room temperature vulcanizable silicone composition that is non-corrosive to copper and brass, has excellent primerless adhesion and is shelf stable.

EXAMPLE 7

Example 7 is a repeat of example 3 with the addition of a continuous addition of 4.0 wt. % of compound 65 (Table 1), methanol scavenging compound, to barrel 13 of the Werner-Pfleiderer extruder. The composition was tested and the results are presented in Table 2. Example 7 demonstrates the effectiveness of compound 65 as an alcohol scavenger that affords a fast curing, alkoxy room temperature vulcanizable silicone composition that is non-corrosive to copper and brass, has excellent primerless adhesion and is shelf stable.

EXAMPLE 8

Example 8 is a repeat of example 3 with the addition of a continuous addition of 4.0 wt. % of compound 130 (Table 1), methanol scavenging compound, to barrel 13 of the Werner-Pfleiderer extruder. The composition was tested and the results are presented in Table 2. Example 8 demonstrates the effectiveness of compound 130 as an alcohol scavenger that affords a fast curing, alkoxy room temperature vulcanizable silicone composition that is non-corrosive to copper and brass, has excellent primerless adhesion and is shelf stable.

EXAMPLE 9

Example 9 is a repeat of example 3 with the addition of a continuous addition of 2.0 wt. % of compound 55 (Table 1), methanol scavenging compound, to barrel 13 of the Werner-Pfleiderer extruder. The composition was tested and the results are presented in Table 2 which demonstrates that at the 2 wt. % level the composition is not shelf stable.

EXAMPLE 10

Example 10 is a repeat of example 5 with the glycidoxypropyltrimethoxysilane removed from the composition and the amount of the methyldimethoxy terminated PDMS polymer increased slightly to 65.64 wt. %. Test results are presented in Table 2. The results demonstrate that example 10 has excellent primerless adhesion. The excellent primerless adhesion demonstrates that the alcohol reaction product of compound 55 is acting as the sole adhesion promoter in the composition because the glycidoxypropyltrimethoxysilane was removed from the composition.

EXAMPLE 11

Example 11 is a repeat of example 6 with the glycidoxypropyltrimethoxysilane removed from the composition and the amount of the methyldimethoxy terminated PDMS polymer increased slightly to 65.64 wt. %. Test results are presented in Table 2. The results demonstrate that example 11 has excellent primerless adhesion. The excellent primerless adhesion demonstrates that the alcohol reaction product of compound 60 is acting as the sole adhesion promoter in the composition because the glycidoxypropyltrimethoxysilane was removed from the composition.

EXAMPLE 12

Example 12 is a repeat of example 5 with the glycidoxypropyltrimethoxysilane removed from the composition and the amount of the methyldimethoxy terminated PDMS polymer increased slightly to 65.64 wt. %. Test results are presented in Table 2. The results demonstrate that example 12 has excellent primerless adhesion. The excellent primerless adhesion demonstrates that the alcohol reaction product of compound 65 is acting as the sole adhesion promoter in the composition because the glycidoxypropyltrimethoxysilane was removed from the composition.

EXAMPLE 13

Example 13 is a repeat of example 8 with the glycidoxypropyltrimethoxysilane removed from the composition and the amount of the methyldimethoxy terminated PDMS polymer increased slightly to 65.64 wt. %. Test results are presented in Table 2. The results demonstrate that example 13 has excellent primerless adhesion. The excellent primerless adhesion demonstrates that the alcohol reaction product of compound 130 is acting as the sole adhesion promoter in the composition because the glycidoxypropyltrimethoxysilane was removed from the composition.

EXAMPLE 14

Example 14 is a repeat of example 5 replacing the dibutyltinacetate catalyst with dibutyltinacetylacetonate. As shown in Table 2, the resulting composition is stable, fast curing, non-corrosive to copper bearing alloys and has excellent primerless adhesion.

TABLE 2

Properties of Cured One Part Alkoxy Curing Room Temperature Vulcanizable Silicone Compositions

| Tests | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|
| E-63 TFT, min. | 20 | 15 | 15 | 15 | 15 | 15 | 15 | 15 | 15 | 15 |
| E-2, Shore A | 23 | 24 | 31 | 28 | 26 | 30 | 24 | 23 | 26 | 24 |
| E-1, Tensile psi | 296 | 271 | 305 | 337 | 291 | 352 | 249 | 281 | 321 | 284 |
| E-1 Elong., % | 325 | 270 | 290 | 316 | 294 | 351 | 308 | 321 | 329 | 318 |
| E-63 TFT*, min. | >24 hr | 15 | 15 | 15 | 15 | 15 | >24 hr | 15 | 15 | 15 |
| E-2, Shore A* | no cure | 24 | 31 | 27 | 22 | 27 | no cure | 25 | 24 | 22 |
| E-1, Tensile * psi | | 286 | 266 | 301 | 312 | 277 | | 279 | 309 | 267 |
| E-1 Elong.,* % | | 265 | 257 | 285 | 354 | 295 | | 302 | 298 | 307 |
| Glass, ppi** | | 1 | 28 | 34 | 32 | 33 | | 32 | 30 | 29 |
| Glass, % CF** | | 0 | 100 | 100 | 100 | 100 | | 100 | 100 | 100 |
| Anod. Al, ppi | | 7 | 24 | 36 | 29 | 26 | | 35 | 39 | 25 |
| Anod. Al, % CF | | 0 | 100 | 100 | 100 | 100 | | 100 | 100 | 100 |
| Bare Al, ppi | | 5 | 29 | 37 | 24 | 35 | | 29 | 29 | 35 |
| Bare Al, % CF | | 0 | 100 | 100 | 100 | 100 | | 100 | 100 | 100 |
| PVC, ppi | | 11 | 33 | 41 | 26 | 31 | | 29 | 34 | 38 |
| PVC, % CG | | 0 | 100 | 100 | 100 | 100 | | 100 | 100 | 100 |
| Vapor, Al | | pass | pass | pass | pass | pass | | | | |
| Vapor, brass | | fail | pass | pass | pass | pass | | | | |
| Vapor, steel | | pass | pass | pass | pass | pass | | | | |
| Vapor, Cu | | fail | pass | pass | pass | pass | | | | |
| Contact, Al | | pass | pass | pass | pass | pass | | | | |
| Contact, brass | | fail | pass | pass | pass | pass | | | | |
| Contact, steel | | pass | pass | pass | pass | pass | | | | |
| Contact, Cu | | fail | pass | pass | pass | pass | | | | |

*after 24 hours at 100° C. accelerated shelf storage plus 7 day cure.
**ppi is peel adhesion and % CF is percent cohesive failure.

Having described the invention that which is claimed is:
1. A room temperature vulcanizable silicone composition comprising:
a) 100 parts by weight of a polyalkoxy terminated polydiorganosiloxane having the formula:

$(R^3O)_{3-a}R^4{}_a Si(OSiR^5R^6)_x OSi(R^3O)_{3-a}R^{4a}$ where $R^3$ is a one to thirteen carbon atom monovalent organic radical selected from the group consisting of alkyl radicals, alkyl ether radicals, alkylketone radicals, alkylcyano radicals and seven to thirteen carbon atom aralkyl radicals, $R^4$, $R^5$, and $R^6$ are each independently one to fifteen carbon atom monovalent organic radicals, x is a number ranging from about 50 to about 2,500 and the subscript a is zero or one whereby the viscosity ranges from about 500 to about 500,000 cps at 25° C.;
b) from about 5 to about 40 parts by weight per hundred parts by weight of polymer (a) of a reinforcing fumed or pyrogenic silica filler;
c) from zero to about 40 parts by weight per hundred parts by weight of polymer (a) of a triorganosilyl endstopped polydiorganosiloxane having the formula:

$R^3{}_3 Si(OSiR^5R^6)_y OSiR^3$ where $R^3$, $R^5$ and $R^6$ are each independently one to fifteen carbon atom monovalent organic radicals where the subscript y is chosen whereby the viscosity ranges from about 10 to about 5,000 cps at 25° C.;
d) from zero to about 5 parts by weight per hundred parts by weight of polymer (a) of a polyalkoxysilane crosslinking agent having the formula:

$(R^3O)_{4-b}R^4{}_b Si$ where $R^3$ and $R^4$ are each independently one to fifteen carbon atom monovalent organic radicals where b is zero, one or two;
e) from zero to about 2 parts by weight per hundred parts by weight of polymer (a) of a cyano-functional silane having the formula:

$(R^7O)_{3-c}R^8{}_c SiR^9 CN$ where $R^7$ and $R^8$ are each independently a one to eighteen carbon atom monovalent organic radical, $R^9$ is a two to twelve carbon atom divalent organic radical and the subscript c is zero, one, two, or three;
f) from zero to about 25 parts by weight per hundred parts by weight of polymer (a) of a silanol fluid comprising:
i) from about 1 to about 80 mole percent mono-organosiloxy units, wherein the mono-organosiloxy units have the formula $R^{10}SiO_{3/2}$;
ii) from about 0.5 to about 50 mole percent tri-organosiloxy units, wherein the tri-organosiloxy units have the formula $R^{10}{}_3 SiO_{1/2}$;
iii) from about 1 to about 80 mole percent di-organosiloxy units, wherein the di-organosiloxy units have the formula $R^{10}{}_2 SiO_{2/2}$; and
iv) from zero to about 25 mole percent siloxy units wherein each siloxy unit has the formula $SiO_{4/2}$;
where each $R^{10}$ in each mono-siloxy unit, in each di-siloxy unit and in each tri-siloxy unit is independently a one to ten carbon atom monovalent organic radical;
g) from about 0.1 to about 1.0 parts by weight per hundred parts by weight of polymer (a) of a tin condensation cure catalyst; and
h) from about 2.5 to about 10 parts by weight per hundred parts by weight of polymer (a) of a 1-sila-azacyclopentane functionalized silicone comprising a monovalent 1-sila-azacyclopentane moiety having the structure:

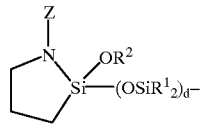

where the subscript d ranges about 1 to about 1,000, $R^1$, $R^2$ and R" are selected from the group of monovalent hydrocarbon radicals having from one to forty carbon atoms and Z is a monovalent radical selected from the group consisting of $SiR''_3$, $-(CH_2)_p(CR^1R^2)_{m-p}NH_t(SiR''_3)_{2-t}$, and $-(CH_2)_p(CR^1R^2)_{m-p}HN(CH2)_q(CR^1R^2)_{r-q}NH_t(SiR''_3)_{2-t}$, where each m and each r each independently range from 1 to 8, each p independently ranges from zero to m and each q independently ranges from zero to r and t is 0, 1, or 2.

2. The composition of claim 1 where $R^1$, $R^2$ and R" are selected from the group of monovalent hydrocarbon radicals consisting of methyl, ethyl, propyl, iso-propyl, trifluoropropyl, n-butyl, sec-butyl, t-butyl, phenyl, and tolyl.
3. The composition of claim 2 where $R^1$ is methyl.
4. The composition of claim 3 where $R^2$ is methyl.
5. The composition of claim 4 where $R^3$ is methyl.
6. The composition of claim 1 where the subscript d ranges from 1 to about 100.
7. The composition of claim 6 where $R^1$ is methyl.
8. The composition of claim 7 where $R^2$ is methyl.
9. The composition of claim 8 where $R^3$ is methyl.
10. The composition of claim 1 where the subscript d ranges from 1 to about 50.
11. The composition of claim 1 where the subscript d ranges from about 2 to about 15.
12. The composition of claim 1 wherein the tin condensation cure catalyst is selected from the group consisting of di-organotin-diketonate, di-organotin-dicarboxylate and tin carboxylate compounds.
13. The composition of claim 5 wherein the tin condensation cure catalyst is selected from the group consisting of di-organotin-diketonate, di-organotin-dicarboxylate and tin carboxylate compounds.
14. The composition of claim 9 wherein the tin condensation cure catalyst is selected from the group consisting of di-organotin-diketonate, di-organotin-dicarboxylate and tin carboxylate compounds.
15. The composition of claim 10 wherein the tin condensation cure catalyst is selected from the group consisting of di-organotin-diketonate, di-organotin-dicarboxylate and tin carboxylate compounds.
16. The composition of claim 11 wherein the tin condensation cure catalyst is selected from the group consisting of di-organotin-diketonate, di-organotin-dicarboxylate and tin carboxylate compounds.
17. A room temperature vulcanizable silicone composition comprising:
a) 100 parts by weight of a polyalkoxy terminated polydiorganosiloxane having the formula:

$(R^3O)_{3-a}R^4{}_a Si(OSiR^5R^6)_x OSi(R^3O)_{3-a}R^4{}_a$ where $R^3$ is a one to thirteen carbon atom monovalent organic radical selected from the group consisting of alkyl radicals, alkyl ether radicals, alkylketone radicals, alkylcyano radicals and seven to thirteen carbon atom aralkyl radicals, $R^4$, $R^5$, and $R^6$ are each independently one to fifteen carbon atom monovalent organic radicals, x is a number ranging from about 50 to about 2,500 and the subscript a is zero or one whereby the viscosity ranges from about 500 to about 500,000 cps at 25° C.;

b) from about 5 to about 40 parts by weight per hundred parts by weight of polymer (a) of a reinforcing fumed or pyrogenic silica filler;

c) from zero to about 40 parts by weight per hundred parts by weight of polymer (a) of a triorganosilyl endstopped polydiorganosiloxane having the formula:

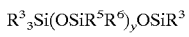

where $R^3$, $R^5$ and $R^6$ are each independently one to fifteen carbon atom monovalent organic radicals where the subscript y is chosen whereby the viscosity ranges from about 10 to about 5,000 cps at 25° C.;

d) from zero to about 5 parts by weight per hundred parts by weight of polymer (a) of a polyalkoxysilane crosslinking agent having the formula:

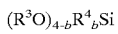

where $R^3$ and $R^4$ are each independently one to fifteen carbon atom monovalent organic radicals where b is zero, one or two;

e) from zero to about 2 parts by weight per hundred parts by weight of polymer (a) of a cyano-functional silane having the formula:

where $R^7$ and $R^8$ are each independently a one to eighteen carbon atom monovalent organic radical, $R^9$ is a two to twelve carbon atom divalent organic radical and the subscript c is zero, one, two, or three;

f) from zero to about 25 parts by weight per hundred parts by weight of polymer (a) of a silanol fluid comprising:
i) from about 1 to about 80 mole percent mono-organosiloxy units, wherein the mono-organosiloxy units have the formula $R^{10}SiO_{3/2}$;
ii) from about 0.5 to about 50 mole percent tri-organosiloxy units, wherein the tri-organosiloxy units have the formula

iii) from about 1 to about 80 mole percent di-organosiloxy units, wherein the di-organosiloxy units have the formula

iv) from zero to about 25 mole percent siloxy units wherein each siloxy unit has the formula $SiO_{4/2}$;
where each $R^{10}$ in each mono-siloxy unit, in each di-siloxy unit and in each tri-siloxy unit is independently a one to ten carbon atom monovalent organic radical;

g) from about 0.1 to about 1.0 parts by weight per hundred parts by weight of polymer (a) of a tin condensation cure catalyst; and h) from about 2.5 to about 10 parts by weight per hundred parts by weight of polymer (a) of a 1-sila-azacyclopentane functionalized silicone comprising a monovalent 1-sila-azacyclopentane moiety having the structure:

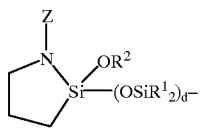

where the subscript d ranges about 1 to about 1,000, $R^1$, $R^2$ and R" are selected from the group of monovalent hydrocarbon radicals having from one to forty carbon atoms and Z is a monovalent radical selected from the group consisting of $SiR''_3$, $-(CH2)_p(CR^1R^2)_{m-p}NH_t(SiR''_3)_{2-t}$, and $-(CH_2)_p(CR^1R^2)_{m-p}HN(CH_2)_q(CR^1R^2)_{r-q}NH_t(SiR''_3)_{2-t}$, where each m and each r each independently range from 1 to 8, each p independently ranges from zero to m and each q independently ranges from zero to r and t is 0, 1, or 2.; whereby the 1-sila-azacyclopentane functionalized silicone reacts with an alcohol to scavenge the alcohol and whereby the reaction product of the alcohol with the 1-sila-azacyclopentane functionalized silicone is an adhesion promoter.

18. The composition of claim 17 where $R^1$, $R^2$ and R" are selected from the group of monovalent hydrocarbon radicals consisting of methyl, ethyl, propyl, iso-propyl, trifluoropropyl, n-butyl, sec-butyl, t-butyl, phenyl, and tolyl.

19. The composition of claim 18 where $R^1$ is methyl.

20. The composition of claim 19 where $R^2$ is methyl.

21. The composition of claim 20 where $R^3$ is methyl.

22. The composition of claim 21 where the subscript d ranges from 1 to about 100.

23. The composition of claim 17 where the subscript d ranges from 1 to about 50.

24. The composition of claim 17 where the subscript d ranges from about 2 to about 15.

25. The composition of claim 17 wherein the tin condensation cure catalyst is selected from the group consisting of di-organotin-diketonate, di-organotin-dicarboxylate and tin carboxylate compounds.

26. The composition of claim 22 wherein the tin condensation cure catalyst is selected from the group consisting of di-organotin-diketonate, di-organotin-dicarboxylate and tin carboxylate compounds.

27. The composition of claim 23 wherein the tin condensation cure catalyst is selected from the group consisting of di-organotin-diketonate, di-organotin-dicarboxylate and tin carboxylate compounds.

28. The composition of claim 24 wherein the tin condensation cure catalyst is selected from the group consisting of di-organotin-diketonate, di-organotin-dicarboxylate and tin carboxylate compounds.

29. A room temperature vulcanizable silicone composition consisting essentially of:

a) 100 parts by weight of a polyalkoxy terminated polydiorganosiloxane having the formula:

where $R^3$ is a one to thirteen carbon atom monovalent organic radical selected from the group consisting of alkyl radicals, alkyl ether radicals, alkylketone radicals, alkylcyano radicals and seven to thirteen carbon atom aralkyl radicals, $R^4$, $R^5$, and $R^6$ are each independently one to fifteen carbon atom monovalent organic radicals, x is a number ranging from about 50 to about 2,500 and the subscript a is zero or one whereby the viscosity ranges from about 500 to about 500,000 cps at 25° C.;

b) from about 5 to about 40 parts by weight per hundred parts by weight of polymer (a) of a reinforcing fumed or pyrogenic silica filler;

c) from zero to about 40 parts by weight per hundred parts by weight of polymer (a) of a triorganosilyl endstopped polydiorganosiloxane having the formula:

$$R^3{}_3Si(OSiR^5R^6)_yOSiR^3$$

where $R^3$, $R^5$ and $R^6$ are each independently one to fifteen carbon atom monovalent organic radicals where the subscript y is chosen whereby the viscosity ranges from about 10 to about 5,000 cps at 25° C.;

d) from zero to about 5 parts by weight per hundred parts by weight of polymer (a) of a polyalkoxysilane crosslinking agent having the formula:

$$(R_3O)_{4-b}R^4{}_bSi$$

where $R^3$ and $R^4$ are each independently one to fifteen carbon atom monovalent organic radicals where b is zero, one or two;

e) from zero to about 2 parts by weight per hundred parts by weight of polymer (a) of a cyano-functional silane having the formula:

$$(R^7O)_{3-c}R^8{}_cSiR^9CN$$

where $R^7$ and $R^8$ are each independently a one to eighteen carbon atom monovalent organic radical, $R^9$ is a two to twelve carbon atom divalent organic radical and the subscript c is zero, one, two, or three;

f) from zero to about 25 parts by weight per hundred parts by weight of polymer (a) of a silanol fluid comprising:
  i) from about 1 to about 80 mole percent mono-organosiloxy units, wherein the mono-organosiloxy units have the formula $R^{10}SiO_{3/2}$;
  ii) from about 0.5 to about 50 mole percent tri-organosiloxy units, wherein the tri-organosiloxy units have the formula $R^{10}{}_3SiO_{1/2}$;
  iii) from about 1 to about 80 mole percent di-organosiloxy units, wherein the di-organosiloxy units have the formula $R^{10}{}_2SiO_{2/2}$; and
  iv) from zero to about 25 mole percent siloxy units wherein each siloxy unit has the formula $SiO_{4/2}$;
where each $R^{10}$ in each mono-siloxy unit, in each di-siloxy unit and in each tri-siloxy unit is independently a one to ten carbon atom monovalent organic radical;

g) from about 0.1 to about 1.0 parts by weight per hundred parts by weight of polymer (a) of a tin condensation cure catalyst; and h) from about 2.5 to about 10 parts by weight per hundred parts by weight of polymer (a) of a 1-sila-azacyclopentane functionalized silicone comprising a monovalent 1-sila-azacyclopentane moiety having the structure:

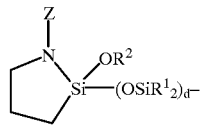

where the subscript d ranges about 1 to about 1,000, $R^1$, $R^2$ and R'' are selected from the group of monovalent hydrocarbon radicals having from one to forty carbon atoms and Z is a monovalent radical selected from the group consisting of $SiR''_3$, $-(CH2)_p(CR^1R^2)_{m-p}NH_t(SiR''_3)_{2-t}$, and $-(CH_2)_p(CR^1R^2)_{m-p}HN(CH_2)_q(CR^1R^2)_{r-q}NH_t(SiR''_3)_{2-t}$, where each m and each r each independently range from 1 to 8, each p independently ranges from zero to m and each q independently ranges from zero to r and t is 0, 1, or 2; whereby the 1-sila-azacyclopentane functionalized silicone reacts with an alcohol to scavenge the alcohol and whereby the reaction product of the alcohol with the 1-sila-azacyclopentane functionalized silicone is an adhesion promoter.

30. The composition of claim 1, wherein the silanol fluid comprises:
  i) from about 10 to about 70 mole percent mono-organosiloxy units;
  ii) from about 5 to about 40 mole percent tri-organosiloxy units;
  iii) from about 10 to about 70 mole percent di-organosiloxy units; and
  iv) from zero to about 10 mole percent siloxy units.

31. The composition of claim 1, wherein the silanol fluid comprises:
  i) from about 20 to about 70 mole percent mono-organosiloxy units;
  ii) from about 5 to about 30 mole percent tri-organosiloxy units;
  iii) from about 20 to about 70 mole percent di-organosiloxy units; and
  iv) from zero to about 5 mole percent siloxy units.

32. The composition of claim 1, wherein the silanol fluid comprises:
  i) from about 20 to about 60 mole percent mono-organosiloxy units;
  ii) from about 10 to about 30 mole percent tri-organosiloxy units;
  iii) from about 20 to about 60 mole percent di-organosiloxy units; and
  iv) zero percent siloxy units.

33. The composition of claim 17, wherein the silanol fluid comprises:
  i) from about 10 to about 70 mole percent mono-organosiloxy units;
  ii) from about 5 to about 40 mole percent tri-organosiloxy units;
  iii) from about 10 to about 70 mole percent di-organosiloxy units; and
  iv) from zero to about 10 mole percent siloxy units.

34. The composition of claim 17, wherein the silanol fluid comprises:
  i) from about 20 to about 70 mole percent mono-organosiloxy units;
  ii) from about 5 to about 30 mole percent tri-organosiloxy units;
  iii) from about 20 to about 70 mole percent di-organosiloxy units; and
  iv) from zero to about 5 mole percent siloxy units.

35. The composition of claim 17, wherein the silanol fluid comprises:
  i) from about 20 to about 60 mole percent mono-organosiloxy units;
  ii) from about 10 to about 30 mole percent tri-organosiloxy units;
  iii) from about 20 to about 60 mole percent di-organosiloxy units; and
  iv) zero percent siloxy units.

36. The composition of claim 29, wherein the silanol fluid comprises:

i) from about 10 to about 70 mole percent mono-organosiloxy units;

ii) from about 5 to about 40 mole percent tri-organosiloxy units;

iii) from about 10 to about 70 mole percent di-organosiloxy units; and iv) from zero to about 10 mole percent siloxy units.

37. The composition of claim 29, wherein the silanol fluid comprises:

i) from about 20 to about 70 mole percent mono-organosiloxy units;

ii) from about 5 to about 30 mole percent tri-organosiloxy units;

iii) from about 20 to about 70 mole percent di-organosiloxy units; and iv) from zero to about 5 mole percent siloxy units.

38. The composition of claim 29, wherein the silanol fluid comprises:

i) from about 20 to about 60 mole percent mono-organosiloxy units;

ii) from about 10 to about 30 mole percent tri-organosiloxy units;

iii) from about 20 to about 60 mole percent di-organosiloxy units; and iv) zero percent siloxy units.

* * * * *